Oct. 27, 1953     F. PERRIER ET AL     2,656,832
MACHINE FOR SAWING STONES AND THE LIKE
Filed April 12, 1951     12 Sheets-Sheet 1
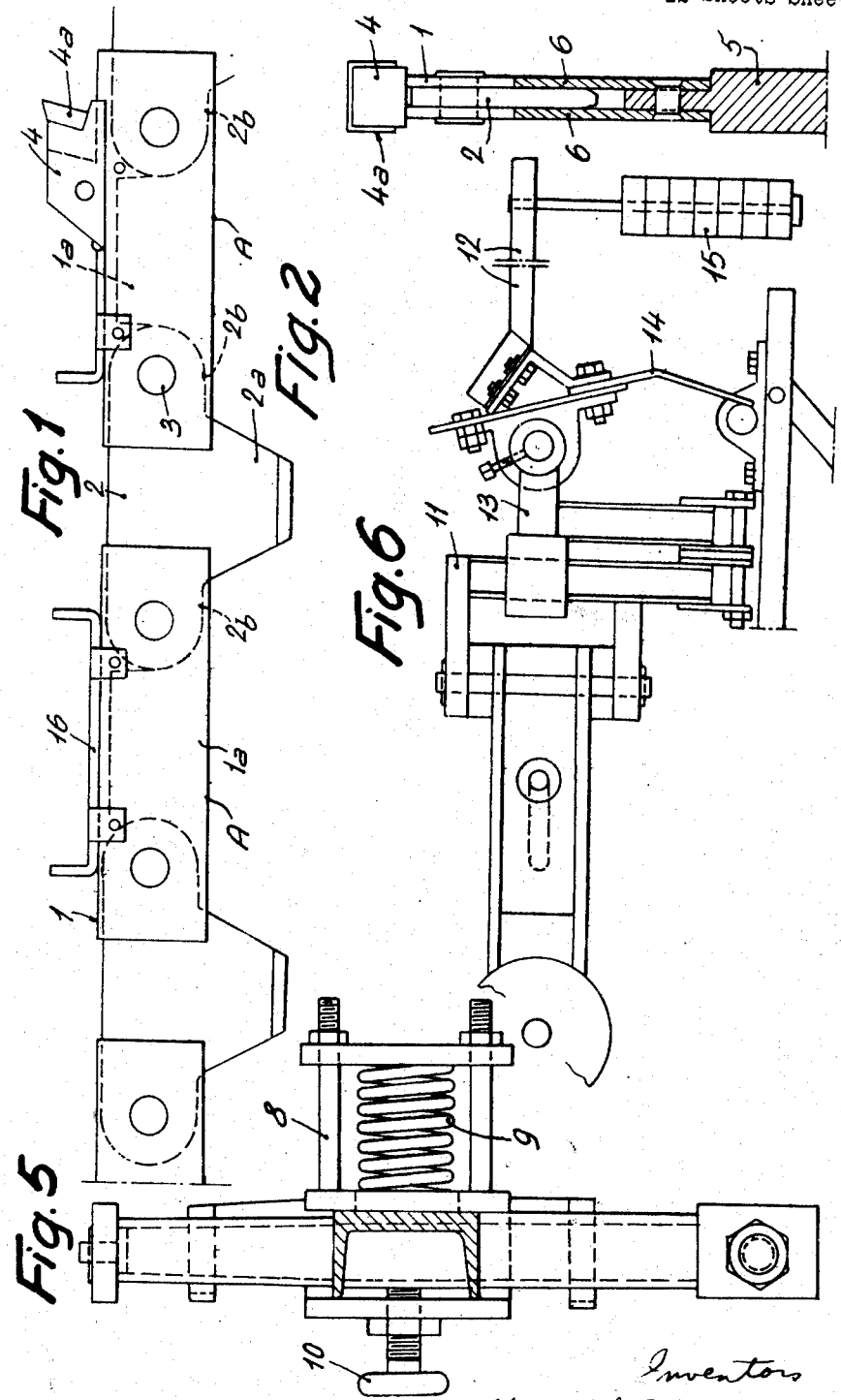

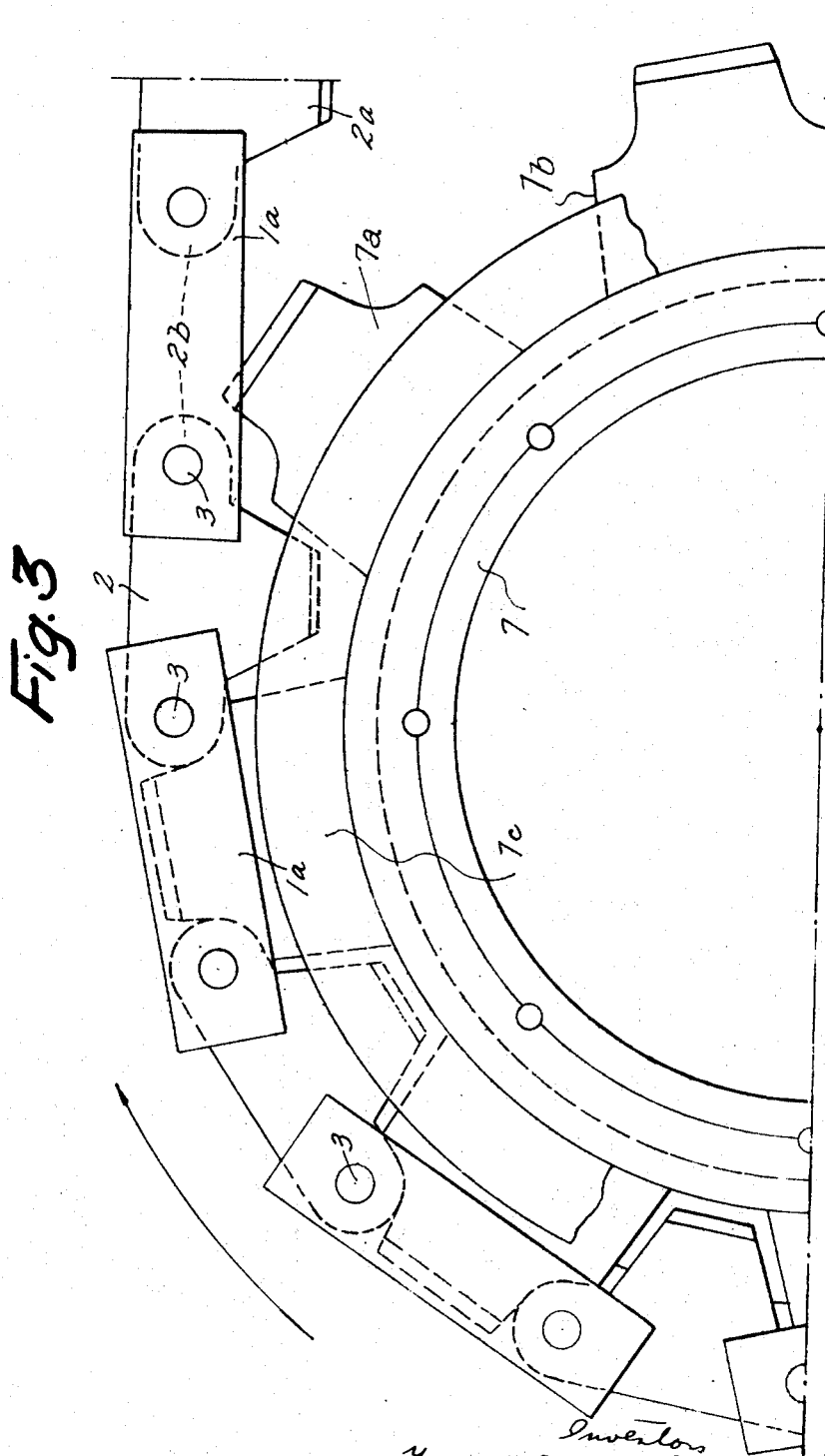

Oct. 27, 1953     F. PERRIER ET AL     2,656,832
MACHINE FOR SAWING STONES AND THE LIKE
Filed April 12, 1951     12 Sheets-Sheet 3
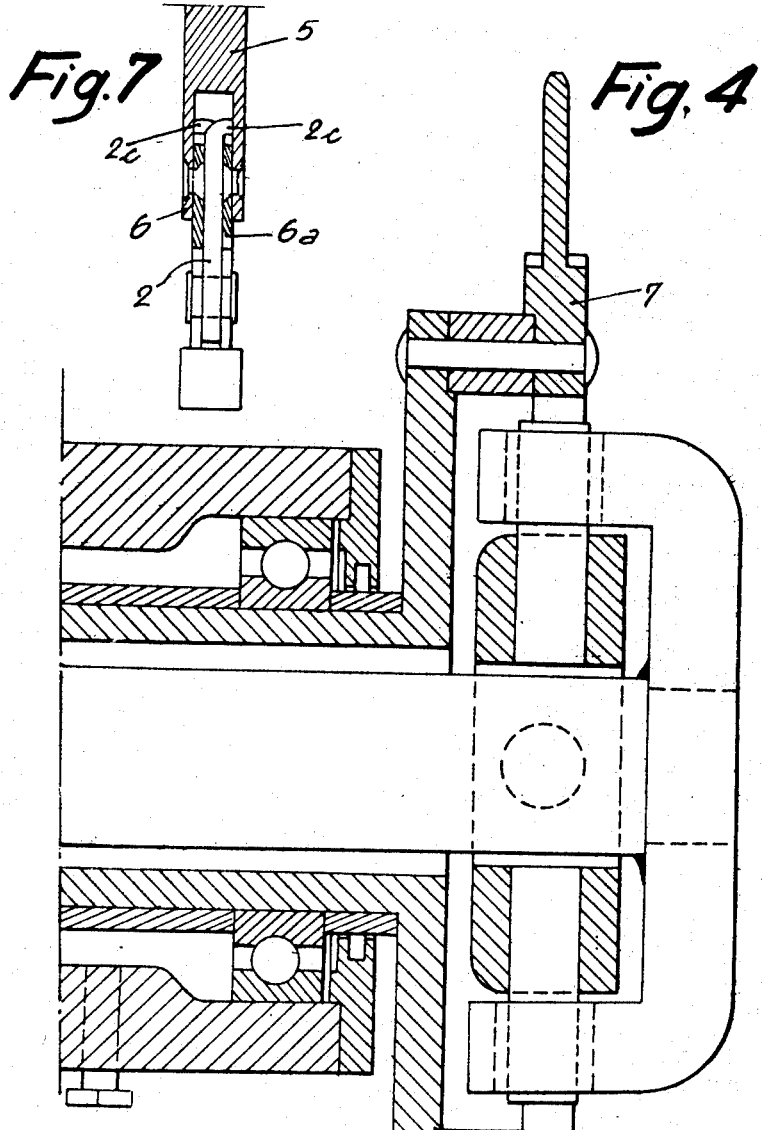
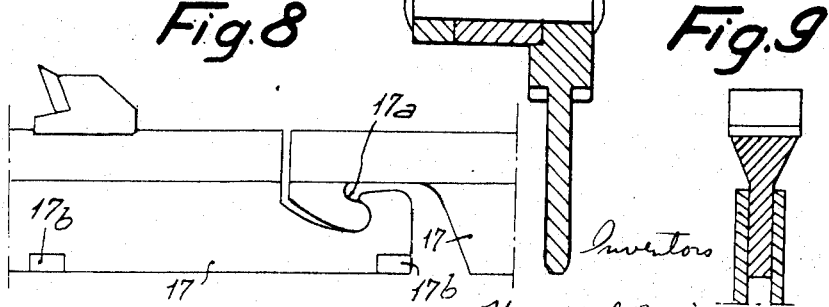

Oct. 27, 1953   F. PERRIER ET AL   2,656,832
MACHINE FOR SAWING STONES AND THE LIKE
Filed April 12, 1951   12 Sheets-Sheet 4
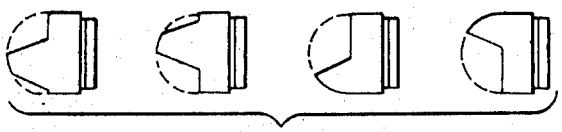
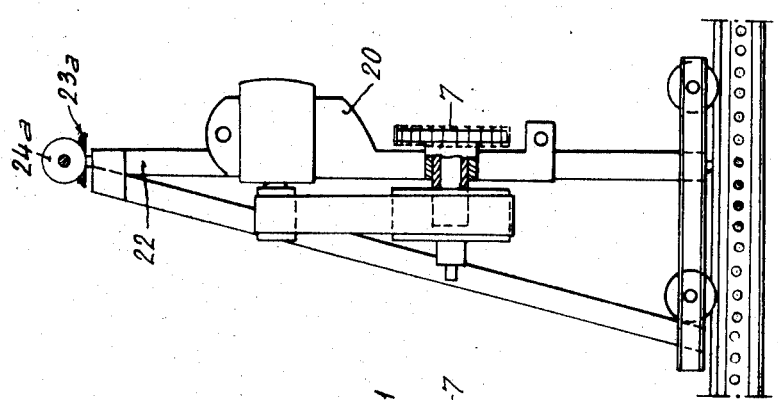
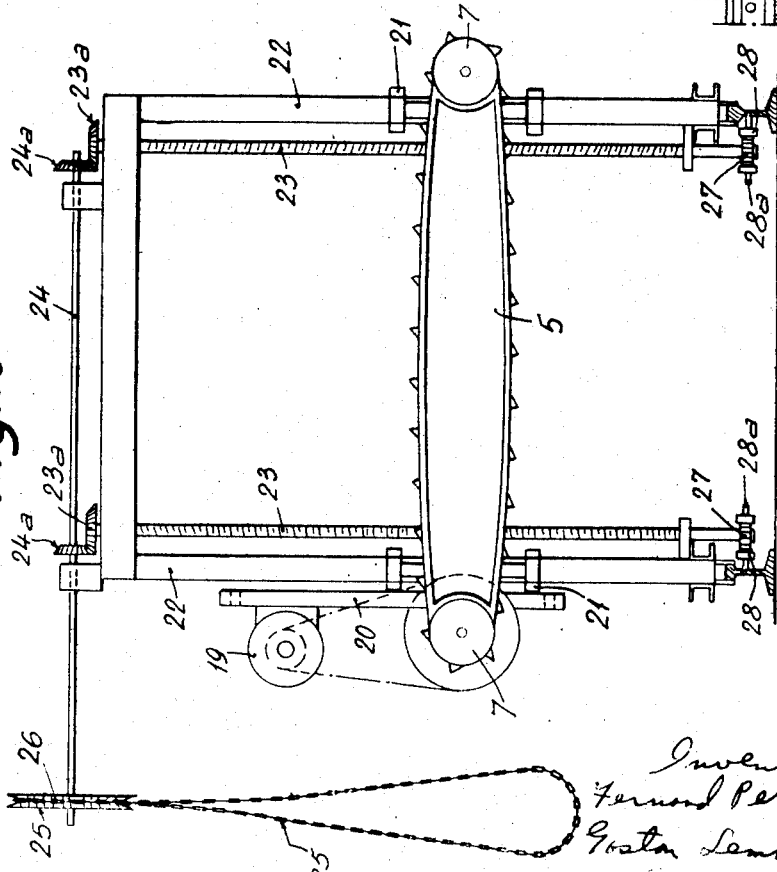

Oct. 27, 1953  F. PERRIER ET AL  2,656,832
MACHINE FOR SAWING STONES AND THE LIKE
Filed April 12, 1951  12 Sheets-Sheet 5

Inventors
Fernand Perrier & Gaston Lemoine
By Young, Emery & Thompson Attys.

Oct. 27, 1953     F. PERRIER ET AL     2,656,832
MACHINE FOR SAWING STONES AND THE LIKE
Filed April 12, 1951     12 Sheets-Sheet 6
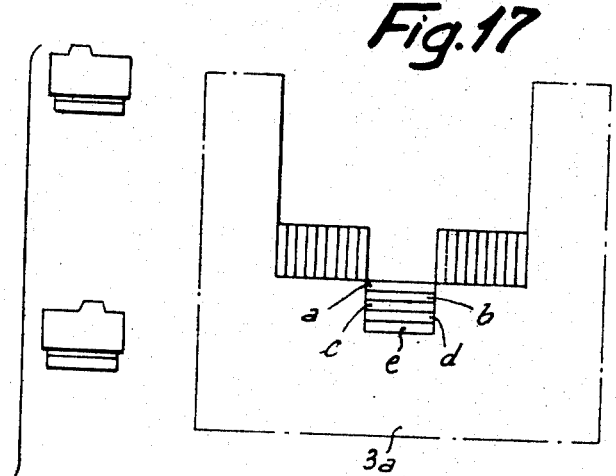
Fig.17
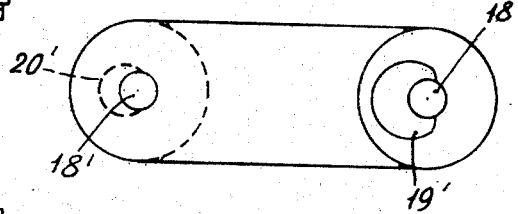
Fig.18
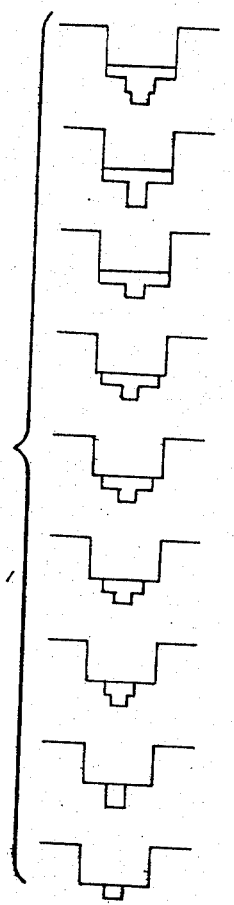
Fig.14    Fig.19    Fig.16
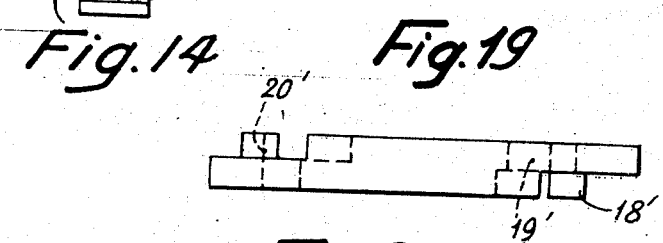
Fig.20     Fig.21
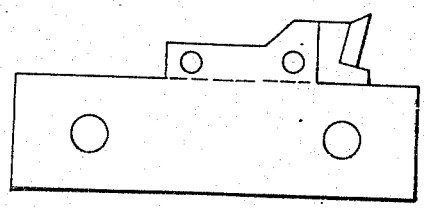 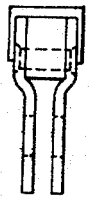
Inventors
Fernand Perrier &
Gaston Lemoine
By Young, Emery & Thompson
Attys.

Oct. 27, 1953
F. PERRIER ET AL
2,656,832
MACHINE FOR SAWING STONES AND THE LIKE
Filed April 12, 1951
12 Sheets-Sheet 7
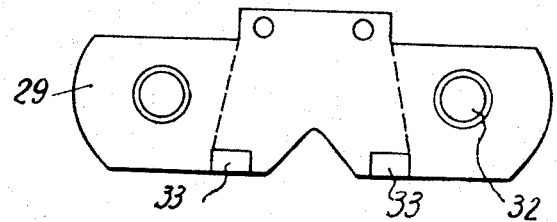
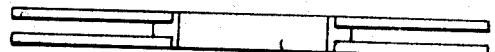
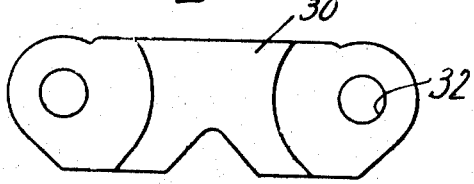
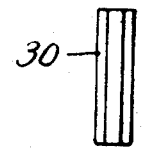
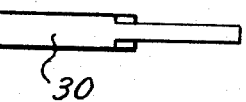
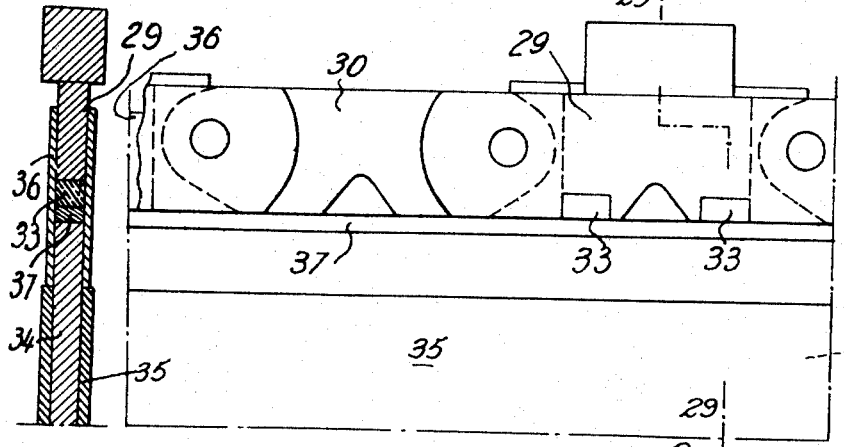

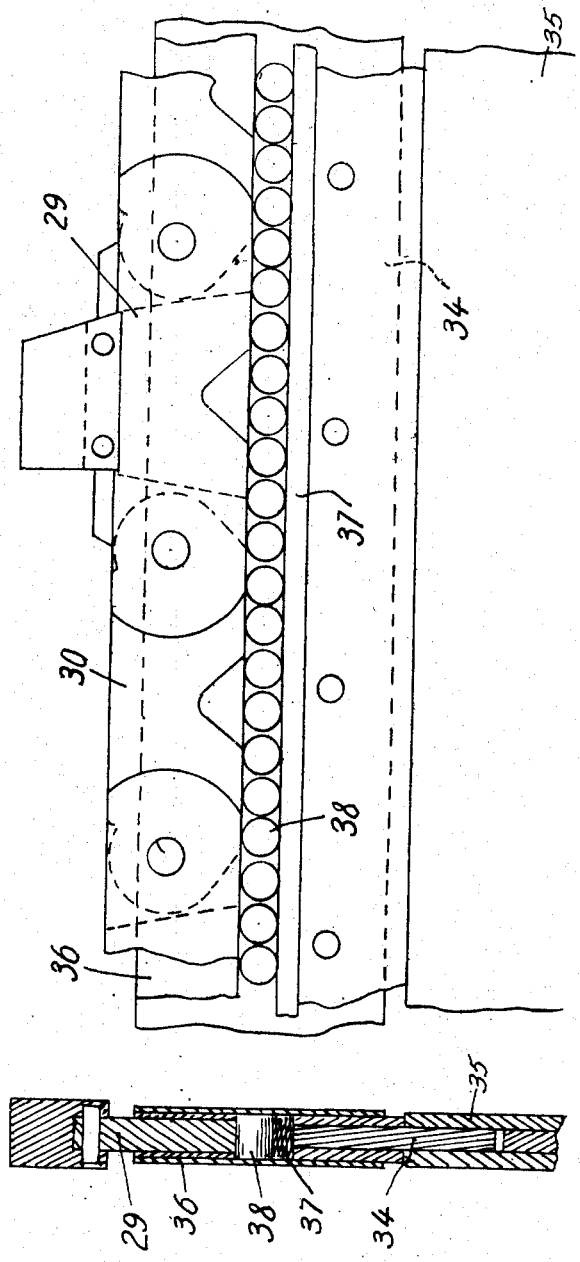

Oct. 27, 1953    F. PERRIER ET AL    2,656,832
MACHINE FOR SAWING STONES AND THE LIKE
Filed April 12, 1951    12 Sheets-Sheet 9

Oct. 27, 1953   F. PERRIER ET AL   2,656,832
MACHINE FOR SAWING STONES AND THE LIKE
Filed April 12, 1951                        12 Sheets-Sheet 10

Oct. 27, 1953 F. PERRIER ET AL 2,656,832
MACHINE FOR SAWING STONES AND THE LIKE
Filed April 12, 1951 12 Sheets-Sheet 11
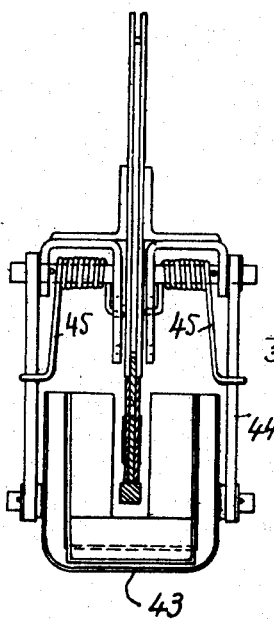
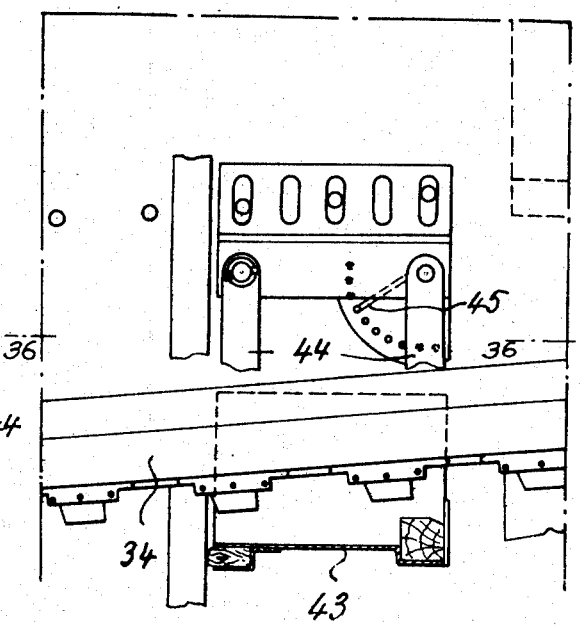
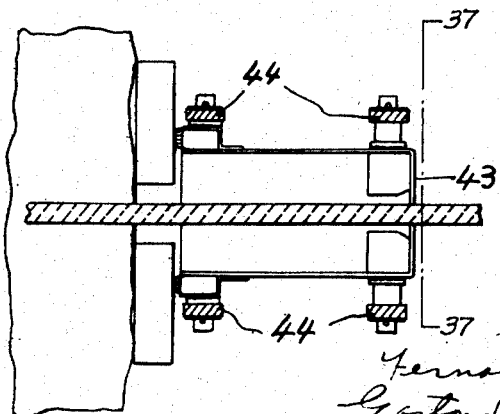

Oct. 27, 1953  F. PERRIER ET AL  2,656,832
MACHINE FOR SAWING STONES AND THE LIKE
Filed April 12, 1951  12 Sheets-Sheet 12
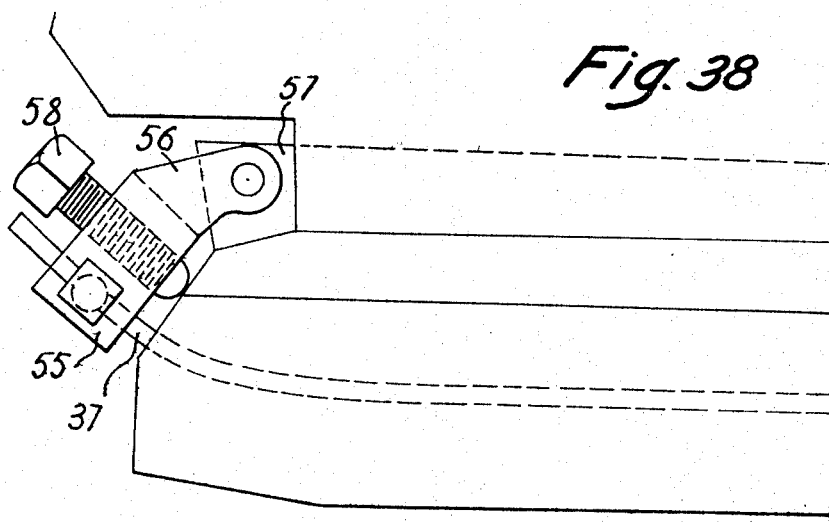
Fig. 38
Fig. 39  Fig. 40
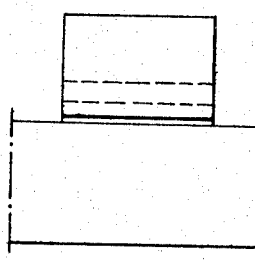
Fig. 41  Fig. 42
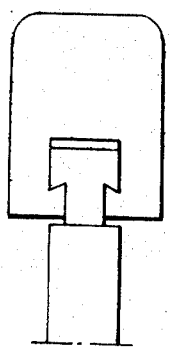
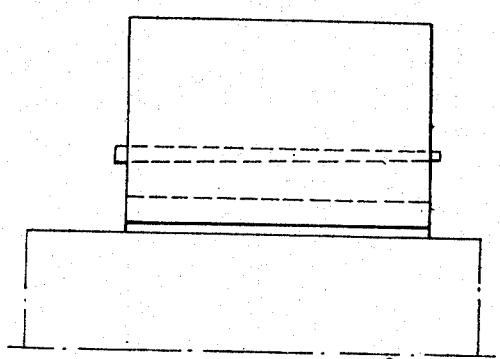

Patented Oct. 27, 1953

2,656,832

UNITED STATES PATENT OFFICE 2,656,832

MACHINE FOR SAWING STONES AND THE LIKE

Fernand Perrier, Neauphle-le-Chateau, and Gaston Lemoine, Auteuil par Thoiry, France Application April 12, 1951, Serial No. 220,552
In France April 15, 1950

5 Claims. (Cl. 125—21)

Our invention has for its object a machine intended more particularly but not exclusively for the sawing of stones. It has for its chief object the provision of a machine the operation of which is easy and the upkeep simple while its efficiency for an equal power is above that provided by the machines of previous types.

According to a main feature of this invention, the operative member of the machine is constituted by a chain of standard one-piece links, said chain being caused to move in a slideway carried by or formed in a beam of uniform resistance.

According to a further feature of the invention, the sawing tools are carried by links in a manner such that the resultant of the forces exerted on said tools urges said links throughout their length against the slideway under substantially uniform pressure conditions.

The transmission of driving force to the chain is executed by a pinion adapted to provide perfect contact and including projecting and receding parts.

Our improved machine is also provided with means for properly directing the chain and the carrier beam.

Further improvements relate to the use of abrasive material such as metal granules and the like material. It is also possible to constitute the chain in a manner such that the operative material does not risk damaging it and this is obtained by constituting the links in a manner such that the chain forms a sort of continuous linked bar advancing in a guiding slideway established in a manner such that the granules or the like abrasive material cannot engage the underside of the chain.

Further, this guide or slideway is preferably laid on a convex or rectilinear beam.

We may also use, if required, means for transforming the translational sliding of the chain in its guiding slideway into a rolling movement and we may also provide means for feeding the chain with abrasive material to be recovered subsequently for re-use.

The invention is characterized in addition to these main arrangements by further arrangements that may be used in combination with the said main arrangements and that will be disclosed hereinafter.

The following detailed description will allow a ready understanding of the invention, reference being made to accompanying diagrammatic drawings given by way of a mere exemplification.

In said drawings:

Fig. 1 is an elevational view of a portion of a link chain according to our invention.

Fig. 2 is a cross-section of a chain link resting on the guiding slideway provided therefor.

Fig. 3 is an elevational side view of a portion of the chain and of the pinion driving same.

Fig. 4 is a cross-section of said pinion.

Fig. 5 is a view of the adjustable end of the slideway carrying beam.

Fig. 6 illustrates a preferred chain tensioning device.

Fig. 7 is a sectional view of a modified slideway.

Figs. 8 and 9 are an elevational and a sectional view of a modified chain link.

Figure 12:
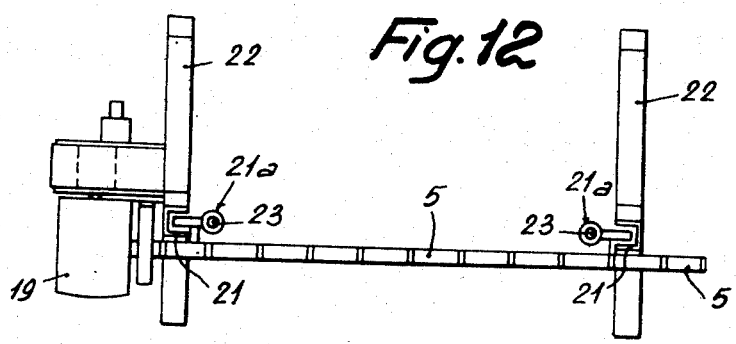

Figs. 10 to 12 relate to a machine incorporating a single motor both for driving the chain and for controlling its vertical and transverse movements.

Figs. 13 to 16 illustrate various forms of tools.

Fig. 17 is a diagram relating to the cut produced by the tools shown in Fig. 16.

Figs. 18 to 21 relate to modifications of the link structure.

Figs. 22 to 24 are elevational plan and end views of a one-piece carrying link.

Figs. 25 to 27 are similar views of an intermediary link, i. e. a link connecting two shoe-carrying links.

Figs. 28 and 29 are respectively a partly torn off elevational view and a sectional view, through line 29—29 of Fig. 28, of the chain in a modified guiding slideway.

Figs. 28a and 29a show in a similar manner to Figs. 28 and 29 a chain adapted to move over rollers in its guiding slideway.

Figure 30:
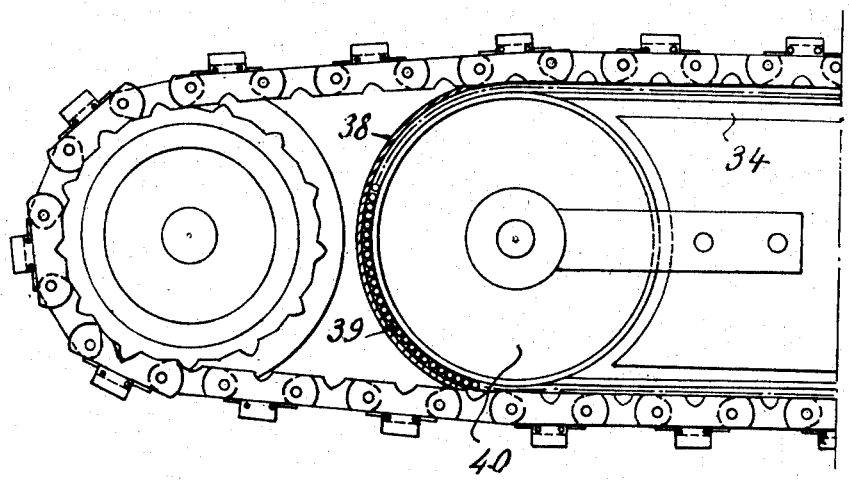

Fig. 30 is an elevational view of means for transforming the sliding of the chain into a rolling movement in its guiding slideway.

Figure 31:
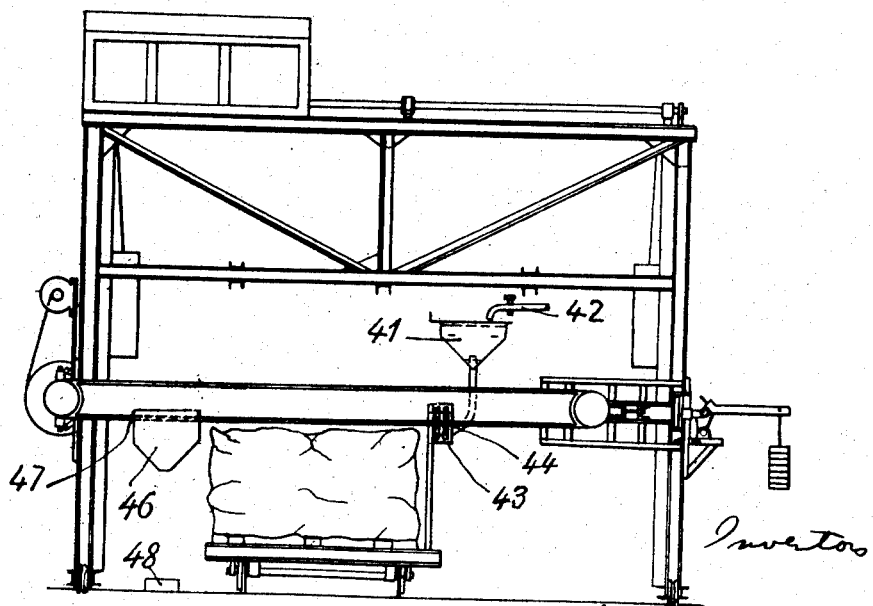

Fig. 31 is a partial elevational view of a machine for sawing stones designed in accordance with a preferred embodiment.

Figure 34:
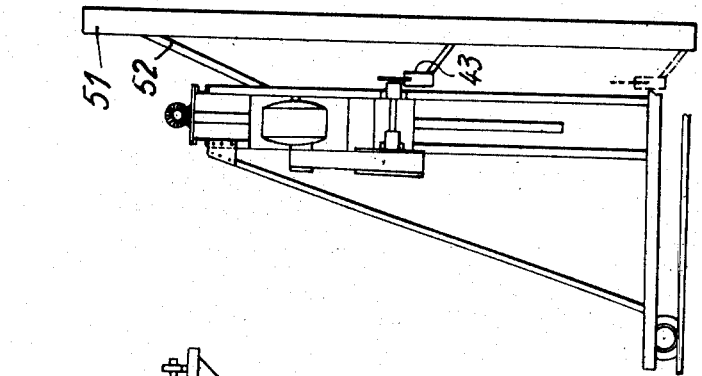
Figure 32:
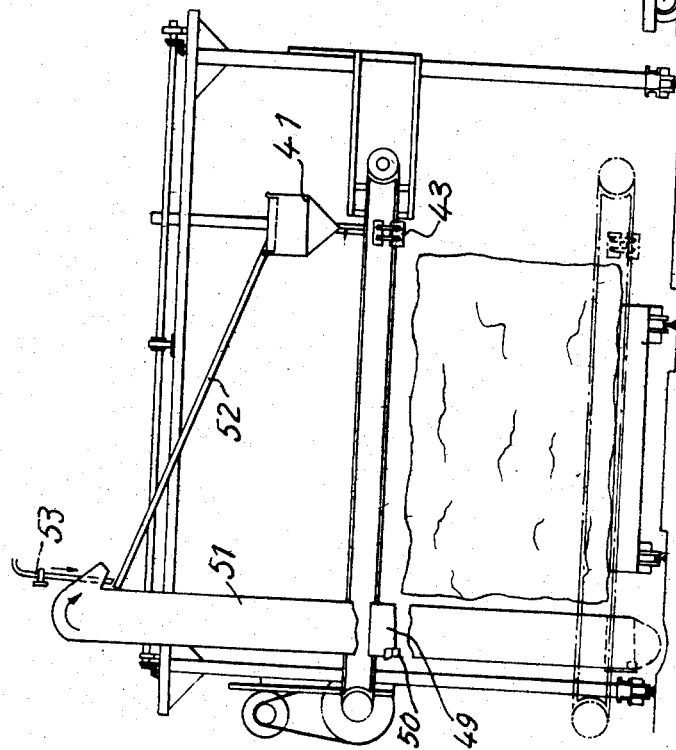
Figure 33:
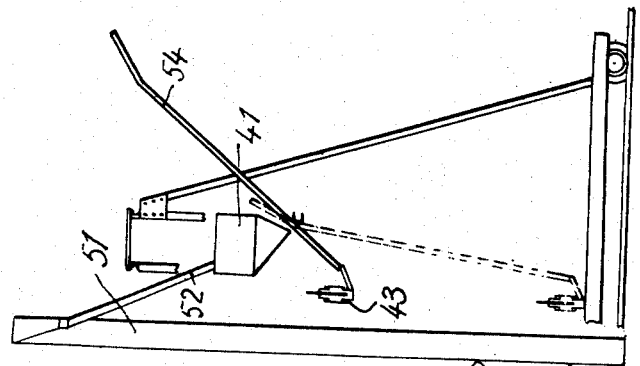

Figs. 32, 33 and 34 are respectively a front elevational view and side views from the right hand side and from the left hand side of a machine established in accordance with a further embodiment of the invention.

Figs. 35, 36 and 37 are respectively an elevational view partly sectional with parts torn off, a horizontal cross-section through line 36—36 of Fig. 35 and a vertical cross-section through line 37—37 of Fig. 36 of the means feeding the chain with abrasive material.

Fig. 38 is an elevational view of means for tensioning the sliding strip for the chain in its guiding slideway.

Figs. 39, 40, 41 and 42 are respectively an end view and an elevational view of means for mounting the insets or shoes on their carrier links.

Turning to Fig. 1, it is apparent that the chain of the machine is constituted by links including members 1 and members 2. The member 1 is constituted by two plates 1a while the member 2 is constituted by a tooth-shaped member 2a provided with two lugs 2b. This member 2 is fitted through its lugs 2b between the ends of two plates 1a of the adjacent members 1. These members 1—2 are pivotally secured to one another through the riveted studs 3; the members 1, or at least a number of them in the embodiment illustrated, carry the actual tools 4. These tools are constituted by small blocks of steel and carry an inset 4a of a highly wear-resisting metal or composition such as tungsten carbide for instance and these tools are shaped and carried by the members 1 in a manner such that the resultant of the forces to which they are submitted during operation may be applied to a point A located approximately midway between the two pivotal connections of the member considered and this resultant may assume a direction that is orthogonal to the latter and the result of this arrangement is to urge the members 1 throughout their length and with a uniform pressure against the slideway to be described hereinafter.

When said chain is in use, it is carried inside a slideway for moving therein, as illustrated in Fig. 2, said slideway being arranged at the periphery of a carrier beam 5 to which a shape of uniform resistance has been given. This slideway is constituted by two slide strips that are preferably removable.

For the control of the chain, we provide at one end of the beam 5 a driving pinion 7 (shown in Fig. 3 without the beam) and at its other end a roller.

The pinion 7 carries teeth 7a engaging the intervals between the two plates 1a forming the members 1 while the intervals 7b between the teeth are engaged by the lugs 2a of the members 2. Flanges 7c form lateral safety members for constraining the chain to remain in mesh with the pinion.

The pinion 7 is driven by a suitable prime mover, say an electric motor that may be rigid with a carrier adapted to slide over an upright of the frame or travelling crane or else with the actual slideway forming a beam 5 of uniform resistance; but the pinion 7 may, instead of being fitted as in the embodiment considered on the shaft of said motor or of a speed reducing gear when such a gear is inserted between the motor and the pinion 7, be secured to said shaft through a universal joint as illustrated in Fig. 4 of the drawings. Thus, the beam and consequently the chain may be set in the desired direction and to further this setting, the end of the chain opposed to that carrying the pinion 7 is arranged in a manner such, as illustrated in Fig. 5, that the beam may cease to be parallel with the frame of the machine. The means used for this purpose include a strap-shaped member 8 rigid with one end of the beam while a coiled spring 9 urges said strap-shaped member against the upright of the frame and a handwheel provided with a threaded stem is used for acting in antagonism with the spring.

Means for tensioning the chain are illustrated in Fig. 6 as constituted by a member 11 slidably carried by the beam through its mounting in a slideway rigid with the beam while a counterweight of an adjustable value is suspended to the end of an arm 12 pivotally secured to a tie member 13 carried by an elastic member 14 balancing the action of the counterweight 15 and reducing thereby said action.

The slideway-carrying beam 5 is obviously movable at both ends and it is carried for this purpose at each end by a carriage adapted to be shifted longitudinally of the corresponding upright of the frame. Said carriages are suspended to cables or chains controlled by a winch secured to a transverse upper beam of said frame.

Along the chain are distributed a number of tool-carrying links and for instance, in the case of a chain 8 meters long, only 16 tool-carrying links need be used. By reason of the comparatively small number of tools, the efficiency of the machine is highly satisfactory even in the case of the sawing of hard or irregularly-shaped stone parts. Its operation is easy, its upkeep simple, and the tools may be ground without dismantling the chain.

It is of advantage to make the chain carry scrapers 16 of the type illustrated in Fig. 1, said scrapers driving in front of them the pulverulent stone material produced through the action of the tools, whereby no clogging of the links is allowed. These scrapers are secured to the links or members 1 through rivets or the like suitable means.

In order to hold the lower chain strand inside the slideway, it is possible to resort to the arrangement illustrated in Fig. 7, which shows that the depending flanges 6 of the slideway 5 are provided on their inner surfaces with small blades 6a while the elements 2 of the chain are provided with small lateral flanges 2c to either side so as to form lugs 2c engaging said blades and preventing the lower strand of the chain from dropping out of the slideway 5 whatever may be the movement assumed by it. Obviously and at a given point of the slideway, say at a point registering with one end of the beam, there is provided an opening wherethrough it is possible to release the chain. It is also obvious that the driving pinion 7 is designed so as to take into account the presence of the lugs 2c on the elements 2.

It is possible, as illustrated in Figs. 8 and 9, to provide links 17 on the chain that are all similar, any two successive links engaging one another through a groove and tongue joint, this joint being such that the chain may mate a predetermined curvature, more particularly for engaging the driving pinion and the groove in the tensioning roller; these links may advantageously assume cross-sectionally the shape illustrated. The drive of the chain may then be provided by giving the pinion a cross-section showing a trapesium-shaped groove the inside of which is lined laterally with frictional material. The links 17 are carried in the slideway through engagement of their lower surface with the race provided between the flanges of the slideway and at the bottom of the latter.

In order to make the repair of said slideway easier, it is made of removable and interchangeable parts while the lower frictional surface of the link 17 is provided with insets 17b of a metal or composition resisting wear such as tungsten carbide. The tools carried by those links that are intended for this purpose are mounted as disclosed hereinabove in a manner such that the resultant of the stresses to which they are submitted may be directed orthogonally with reference to their surface, while passing through a point at equal distances from the pivotal connections, said resultant urging throughout the surface the lower part of the link against the bottom of the slideway under uniform pressure conditions. This constitution of the chain has the advantage of allowing a substantially instantaneous replacement of an element of the chain.

The above described machine is supposed to include two motors of which one serves for the driving of the chain and the other for raising and lowering the chain-carrying beam and for the transverse translational movement of the frame.

It is possible as illustrated diagrammatically in Figs. 10 to 12 to constitute a machine with a single motor. It is sufficient to ensure the vertical shifting of the chain-carrying beam by providing the latter with two sliders inside which are mounted loose two nuts engaging two vertical threaded shafts controlled in unison by a horizontal shaft whereby their rotations are made synchronous. The machine illustrated in said Figs. 10 to 12 includes a beam of uniform resistance 5 serving as a chain guide. For actuating said machine, we resort to a single prime mover 19, an electric motor in the case illustrated. Said motor is carried on a support 20 and this support and also the beam 5 are rigid with two sliders 21 adapted to move in slideways provided in the vertical uprights forming the running frame 22. The motor 19 drives through a belt or the like the pinion 7 driving the chain.

For obtaining the desired vertical displacements of the support 20 and of the chain-carrying beam, we resort to two vertical threaded spindles 23 and associated stationary nuts 21a (Fig. 12) that are carried by the system including the support 20 and the chain-guiding beam 5, said nuts 21a being held against longitudinal motion over the spindle 23.

Each spindle 23 is provided at its upper end with a bevel pinion 23a meshing with a bevel pinion 24a keyed to a common horizontal spindle 24. The rotation of said horizontal spindle 24 is obtained by acting on a chain 25 engaging a pinion 26 keyed to the end of said spindle 24. It will be readily understood that by acting on the spindle 24 in either direction, the spindles 23 will be caused to rotate and consequently to screw or unscrew in the nuts 21a carried by the system including the beam 5 and the sliders 21. This causes thus the whole said system including the support 20 and the chain-guiding beam 5 to rise and to sink.

The machine may be equipped with a motor mounted on the spindle of the chain-driving pinion at the end of the chain-guiding beam. The system including the motor and the beam may be adapted to rock round a horizontal transverse axis with reference to the sliders 21 whereby last mentioned system is adapted to pivot for horizontal sawing.

The horizontal translational movement of the movable frame may be obtained for instance by providing the lower ends of the spindles 23 with means such as pinions 27 engaging chains 28 provided with projections 28a adapted to engage openings provided in one of the rails on which the frame is adapted to move. In this case, it is necessary to provide means for disengaging the nuts 21a by alternatingly releasing them with reference to the sliders 21 and holding them fast thereon when it is desired to make the chain-guiding beam 5 rise or sink.

In order to prevent any flexional movement of the beam 5 while the machine is being used for horizontal sawing, the beam is provided at the end opposed to the driving pinion 7 with an arm forming an extension thereof and to which are suspended weights equilibrating the weight of the motor and preventing the beam from flexing.

It should be remarked that the elements 1 and 2 are pivotally secured with reference to one another through the agency of equidistant rivets but that the elements 1 are longer than the elements 2 as they form the actual tool-carrying links.

It is possible to incorporate to the machine an arrangement, such as bellows, projecting into the input end of the chain a dry lubricant such as sulphur flowers or graphite. It is also possible to provide a shoe or inset made of lead in a suitable position. We may also prevent any accumulation of dust through a cleaning geyser blowing the dust off.

Figure 13:
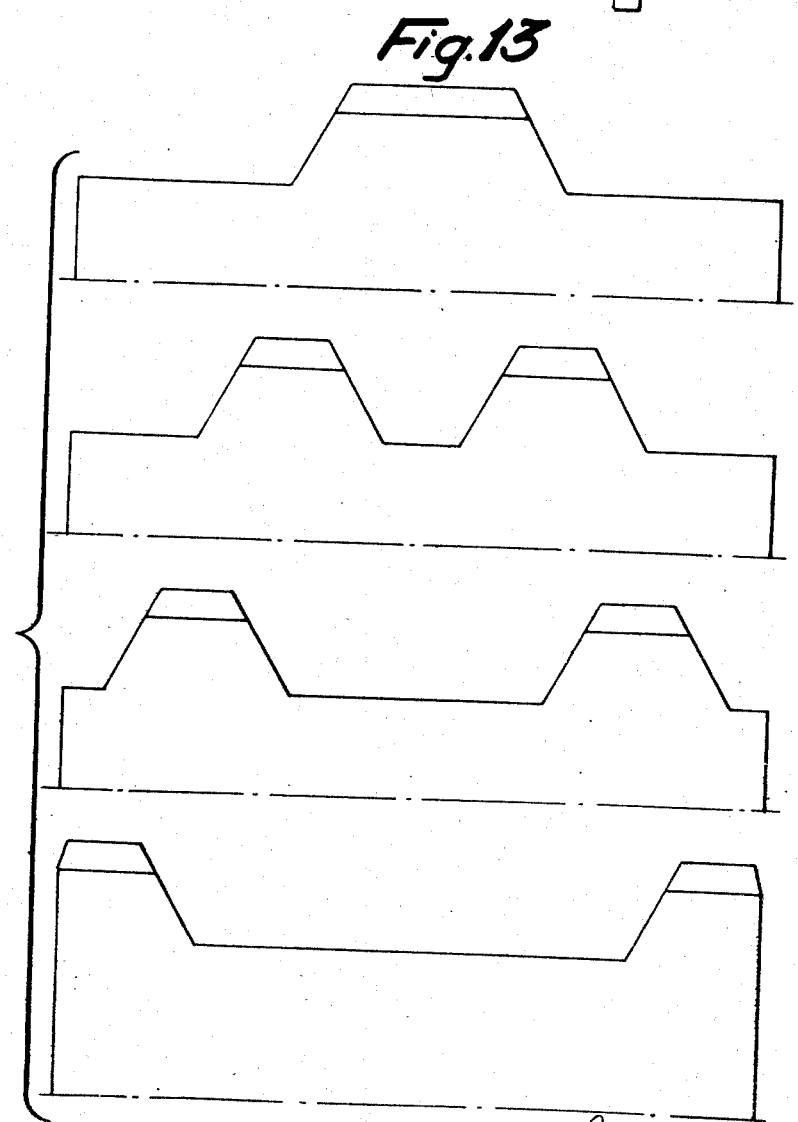

In order to obtain a better efficiency of the machine through a gradual execution of the sawing operation, care should be taken to subdivide the tools. For instance, for obtaining an equilibrated subdivision that cuts out any lateral shifting of the tools and that consequently protects the chain against any dissymmetrical lateral stresses, we proceed as illustrated in Fig. 13 showing on a large scale and diagrammatically a series of four successive tools, the tool at the uppermost end being the first tool to engage the stone.

It will be readily ascertained through mere inspection of the drawing that each tool of this series planes and widens the set produced by the preceding tool. The second tool opens again the set provided by the first tool and the third tool opens the set produced by the second tool, the successive tools being arranged with a gradually decreasing projection.

It is also possible as illustrated in Fig. 14 to diverge from the rule according to which the above described subdivision is established by constituting a series of tools receding with reference to one another.

It is also possible to resort to the tool illustrated in Fig. 15 that provides a saw cut having a curvilinear bottom. It is possible to give the tool and other suitable desired shape without unduly widening thereby the scope of the invention as defined in accompanying claims.

Now, in order to reduce the possibility of splitting at the end of the saw cut chiefly when the stone is to be used with the surface considered appearing to view, we resort to the subdivision of tools illustrated in Figs. 16 and 17. Fig. 16 shows the shape of the successive tools that are to be used while Fig. 17 shows on a larger scale and in front view the traces made by the tools. These tools are advantageously mounted with a gradually decreasing projection.

It will be readily ascertained that the sawing is produced first through a cut the breadth of which is equal to that of the axial plane after which the side edges of the tools plane as the sawing progresses the sides of the saw cut and the splitting is hardly perceptible. At this moment, corresponding to the end of the sawing operation, it is possible to obtain a still better result by slowing down the speed of progression of the chain.

Our invention is not limited to the various embodiments that have been disclosed more particularly and it covers all the modifications falling within the scope of accompanying claims and in particular the chain, instead of returning over the beam 5, may return over two guiding rollers carried by the frame in the plane of the chain-guiding beam whereby it is possible to use a longer chain carrying consequently a larger number of tools or of series of tools, said rollers being positioned high enough for the upper strand not to return into the stone during the sawing operation.

It is also possible to provide links of the type illustrated in Figs. 18 and 19, said links being adapted to engage one another through the agency of a small spindle-forming boss 18'. These links carry at one end a semi-circular opening 19' and at their other end a crescent-shaped tenon 20' and said links are provided at each end with a joint, the joints at either end being located to either side of the longitudinal medial plane of the links.

Furthermore, it is possible to removably secure the tool-carrying element on the links in order to make the replacement of the tools easier without it being necessary to remove the chain, this latter modification being illustrated in Figs. 20 and 21. Similarly, it is possible to resort to tools the operative portions of which are provided with diamonds or are constituted by diamonds, in the case for instance of the sawing of a hard stone such as porphyry. Again, it is possible in certain cases to secure the tool carriers or diamond carriers on elastic arrangements of the type known under the registered trade-mark Silentblock or the like elastic arrangements damping shocks and vibrations, said arrangements being secured to the links. A further modification may consist, in the case of the sawing of certain materials, in replacing the tool carriers by sort of shoes that may be used in cooperation with granular abrasive material acting through a crushing or wearing action or else with hard metal granules.

In the modification illustrated in Figs. 22, 23 and 24, each link 29 adapted to carry a shoe operatively engaging the stone is formed of one piece of steel machined in a manner such that it is provided with hinges, a notch and a shoe-carrying boss. A chain constituted by such shoe-carrying links is adapted to engage the stone with the aid of abrasive material fed to the links and furthering the engagement of the stone by the latter, said abrasive material being fed, as disclosed later with reference to Figs. 32 to 37, through means tightly engaging the stone on the underside of the chain strand entering the stone.

Figs. 25, 26 and 27 illustrate in a similar manner an intermediary one-piece link 30. The different links are interconnected through studs 31 engaging the openings 32 to form the actual chain. The pivotal connections or hinges interconnecting the links are therefore constituted by a strap and a lug provided with circular fitted ends.

The shoes may, as already disclosed, be inserted advantageously on the links in a manner such as to allow their easy replacement without requiring a dismantling of the chain. The mounting of the shoes on the shoe-carrying links may advantageously be provided through the agency of elastic pins. The openings in the intermediary links may be provided with removable rings. The links are provided with a V-shaped recess for allowing a drive at a higher speed than that allowed by a pinion the teeth of which engage between the links as disclosed with reference to Figs. 1 to 3.

It is also of advantage to provide all the links or only the shoe-carrying links, as disclosed hereinabove, with wear-resisting insets 33 of a very hard composition such as tungsten carbide or else the lower surface of the links is hardened by suitable treatments or incorporation of material. The chain is caused to move inside a guiding slideway 34 that is carried by a rectilinear or incurved beam 35 or by a beam that is rectilinear along its lower surface.

The slideway 34 (Figs. 28 and 29) includes at the bottom of the groove defined by its removably fitted flanges 36 a friction strip 37 that may be rapidly changed and that may extend only over the lower part of the guiding slideway 34. Lateral strips protect more particularly the chain against the introduction of granular or the like abrasive material.

The chain may be mounted so as to slide or to roll inside the guideway, the rolling contact being provided for reducing adherence through the insertion between its bottom and the strip 37 (which is frictional only when rolling means are not resorted to) of rollers, needles, balls or the like rolling means.

Figs. 28a and 29a show the mounting of the chain on rollers 38 together with means for transferring the rollers from the upper end of the slideway to its lower end. This transferring means includes an arcuate member 39 (Fig. 30) that collects the rollers 38 between the said arcuate member and a smooth pinion 40 loosely revoluble on its spindle and adapted to guide said rollers towards the lower strand of the chain between the latter and the strip 37 lying in the bottom of the guiding slideway.

The chain is fed with abrasive material that is subsequently recovered through the following arrangement: a funnel shaped hopper 41 (Fig. 31) opens at its lower end through a triangular opening closed by an adjustable sluice gate and capped by a sieve covering it completely. Said sieve is adapted to oscillate horizontally. During operation, the granular or the like abrasive material contained in the hopper 41 is bathed by the water flowing from a tap 42 provided above the sieve, which latter stops the impurities and allows only the granular abrasive material to pass. A feed trough 43 assuming cross-sectionally the shape of a U is provided at its ends with openings for the passage of the chain and is located at the lower part of the beam quite near the stone block to be cut. One of its surfaces is lined with a strip of sponge rubber or of a suitable material forming a joint and frictionally engaging the end of the block to be sawn. The granular abrasive material fed by the hopper 41 through a gutter or pipe is carried along by the chain which produces a continuous film of granular material as soon as the stone engages the shoes on the links.

The trough 43 is pivotally connected through the levers 44 (Figs. 35 to 37) with supports that are rigid with the beam and it is urged against the block by springs 45.

A four-sided hopper-shaped receiver 46 for the granular material is provided with a slot (Fig. 31) whereby it may engage the lower part of the beam in order to collect the granular material carried along by the chain.

Said granular material flows into an openwork basket 48 which allows the water and sludge to flow out of it while the granular material is held back in the basket. As soon as said basket 48 is full, it is emptied manually into the hopper 41.

The feed and recovery of said granular material may be provided mechanically. A mechanical feed system according to our invention is constituted as follows: a collecting container 49 substantially similar to that described hereinbefore may be provided with a flat bottom or else it may terminate with a circular piping 50 (Fig. 32) through which the granular material is removed laterally.

The longitudinal and rotary movements are provided through the speed acquired by said granular material projected by the sawing chain.

The piping 50 is connected with a bucket elevator 51 the lower part of which is perforated for allowing the sludge and water to pass out of it while the granular material is fed to the upper end of the machine and projected into a sloping gutter 52 opening into the hopper 41 that is preferably secured to the frame of the machine instead of being secured to the movable beam. At the upper end of the gutter, water is poured into it through a tap 53 to moisten the granular material.

A second movable gutter 54 adapted to follow the downward movement of the beam opens into the feed trough and closes thus the feed circuit. It is also possible to use for this purpose telescopic gutters or tubes.

In all cases where use is made of abrasive material, whether recovered or otherwise, jets of water are used for washing the chain as it passes out of the block that is being sawn.

It is of advantage to secure the shoes to the links that are to carry them, no longer through the agency of rivets or spindles but through the arrangements illustrated in Figs. 39 to 42.

In Figs. 39 and 40, it is apparent that the shoe or block is fitted to the link through a dovetailed tenon and mortise joint while Fig. 40 shows the shoe as fitted again on the link through a tenon and mortise, the latter being however of a special shape and the assembly is maintained in this case by a sort of cotter with a triangular longitudinal cross-section. The resistance opposing the progression of the shoe over the link increases the tendency of the latter to keep in the desired location and the more the resistance is, the more the shoe wedges the cotter inside the tenon.

It is also of advantage to provide for the tensioning of the frictional strip 27 through the agency of the means illustrated in Fig. 38. This arrangement includes a member 55 provided with a strap portion 56 engaging a lug 57 provided on the beam, said member 55 being engaged by the end of the friction strip 37 the tensioning of which is ensured by a screw 58 bearing against the beam. The shoes or insets are preferably provided with rounded edges instead of sharp edges so as to ensure a better distribution of the layer of granular or the like abrasive material that is used. It is also possible to provide for the handling of said granular material by means of a circuit of water flowing through a pipe starting from a header and leading to the feed trough. This circuit of water is controlled by a pump such as a loaded centrifugal pump. In a modification, the trough may be cut out and the jet of water and granular material projected directly onto the shoes at the input end of the block. There may be provided in the circuit washing and sieving means. It is also possible to replace the water by air inside the conveying system considered.

What we claim is:

1. In a stone-sawing machine, the combination of a frame, an endless chain carried by said frame and including a plurality of similar interconnected links, means controlling the progression of the chain along a path engaging the stone, frictional shoes carried by at least a number of said links on their outer surfaces and adapted to operatively cut the stone, a trough assuming cross-sectionally the shape of a U and surrounding at a small distance the sides and the outer part of the portion of the chain in register with the section of the path of said chain just ahead of the point at which it is about to engage the stone, lever arms the ends of which are pivotally connected with said trough and with the frame respectively, a spring urging the trough into fluidtight contacting relationship with the surface of the stone facing the chain strand entering it and means for feeding abrasive material into said U-shaped trough to further the progression of the stone-cutting shoe inside the stone.

2. In a stone-sawing machine, the combination of a frame, an endless chain carried by said frame and including a plurality of similar interconnected links, a slideway in which the chain links are adapted to progress towards the stone, said slideway fitted over the sides and the outer part of the chain, a friction liner inside the slideway in sliding contacting relationship with the outer part of the chain links, means controlling the progression of the chain along a path engaging the stone, frictional shoes carried by at least a number of said links on their outer surfaces and adapted to operatively cut the stone, a trough assuming cross-sectionally the shape of a U and surrounding at a small distance said slideway in register with the section of the path of said chain just ahead of the point at which it is about to engage the stone, lever arms the ends of which are pivotally connected with said trough and with the frame respectively, a spring urging the trough into fluidtight contacting relationship with the surface of the stone facing the chain strand entering it and means for feeding abrasive material into said U-shaped trough to further the progression of the stone-cutting shoe inside the stone.

3. In a stone-sawing machine, the combination of a frame, an endless chain carried by said frame and including a plurality of similar interconnecting links, means controlling the progression of the chain along a path engaging the stone, frictional shoes carried by at least a number of said links on their outer surfaces and adapted to operatively cut the stone, a trough assuming cross-sectionally the shape of a U and surrounding at a small distance the sides and the outer part of the portion of the chain in register with the section of the path of said chain just ahead of the point at which it is about to engage the stone, lever arms the ends of which are pivotally connected with said trough and with the frame respectively, a spring urging the trough into fluidtight contacting relationship with the surface of the stone facing the chain strand entering it and means for feeding abrasive material into said U-shaped trough to further the progression of the stone-cutting shoe inside the stone.

4. In a stone-sawing machine, the combination of a frame, an endless chain carried by said frame and including a plurality of similar interconnected links, means controlling the progression of the chain along a path engaging the stone, frictional shoes carried by at least a number of said links on their outer surfaces and adapted to operatively cut the stone, a trough assuming cross-sectionally the shape of a U and surrounding at a small distance the sides and the outer part of the portion of the chain in register with the section of the path of said chain just ahead of the point at which it is about to engage the stone, lever arms the ends of which are pivotally connected with said trough and with the frame respectively, a packing on the end of the trough facing the stone for engagement with said stone, a spring urging the trough into fluidtight contacting relationship with the surface of the stone facing the chain strand entering it and means for feeding the abrasive material and water into the trough to fill the latter up to a level registering with the outer surface of the links as they are about to engage the stone and means for recycling the water and abrasive material from the point at which the chain passes out of the stone back into the means feeding said water and abrasive material into the trough, said recycling means including means for removing the excess water and sludge admixed with the abrasive material into said U-shaped trough.

5. In a stone-sawing machine, the combination of a frame, an endless chain carried by said frame and including a plurality of similar interconnected links, means controlling the progression of the chain along a path engaging the stone, frictional shoes carried by at least a number of said links on their outer surfaces and adapted to operatively cut the stone, a trough assuming cross-sectionally the shape of a U and surrounding at a small distance the sides and the outer part of the portion of the chain in register with the section of the path of said chain just ahead of the point at which it is about to engage the stone, lever arms the ends of which are pivotally connected with said trough and with the frame respectively, a spring urging the trough into fluidtight contacting relationship with the surface of the stone facing the chain strand entering it and a passageway starting from the point at which the links engaging the stone being cut pass out of the latter and returning into the trough and mechanically controlled means urging water and abrasive material through said passageway into the trough and back through the stone being cut into the starting point of the passageway.

FERNAND PERRIER.
GASTON LEMOINE.

References Cited in the file of this patent
UNITED STATES PATENTS

| Number | Name | Date |
|---|---|---|
| 589,199 | Wincgz et al. | Aug. 31, 1897 |
| 651,330 | Harvey | June 5, 1900 |
| 771,065 | Hanley | Sept. 27, 1904 |
| 840,314 | Gray et al. | Jan. 1, 1907 |
| 900,174 | Klingenberg | Oct. 6, 1908 |
| 995,269 | Maurino | June 13, 1911 |
| 1,043,433 | Jackson | Nov. 5, 1912 |
| 1,351,892 | Corrigan | Sept. 7, 1920 |
| 2,442,153 | Van der Pyl | May 25, 1948 |
| 2,549,236 | Rathert et al. | Apr. 17, 1951 |